United States Patent
Pagac et al.

(10) Patent No.: US 6,565,978 B1
(45) Date of Patent: May 20, 2003

(54) MULTI-COMPONENT COMPOSITE COATING COMPOSITION AND COATED SUBSTRATE

(75) Inventors: Edward S. Pagac, Portersville, PA (US); Daniel E. Rardon, Gibsonia, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/250,529

(22) Filed: Feb. 16, 1999

Related U.S. Application Data

(60) Provisional application No. 60/075,030, filed on Feb. 18, 1998.

(51) Int. Cl.[7] .............................................. B32B 27/26
(52) U.S. Cl. ............................. 428/423.1; 428/423.3; 428/423.5; 428/423.7; 428/427.4; 428/427.7; 428/475.2; 428/480; 428/424.4; 428/475.8; 428/500
(58) Field of Search .................. 428/423.1, 423.3, 428/423.5, 423.7, 474.4, 474.7, 475.2, 480, 424.4, 475.8, 500

(56) References Cited

U.S. PATENT DOCUMENTS

| | | | |
|---|---|---|---|
| 3,684,759 A | 8/1972 | Reiff et al. .......... 260/29.6 NR |
| 4,070,323 A | 1/1978 | Vanderhoff et al. .. 260/29.6 NR |
| 4,271,051 A | 6/1981 | Eschwey ................ 260/22 M |
| 4,335,029 A | 6/1982 | Dabi et al. ................. 524/589 |
| 4,451,596 A | 5/1984 | Wilk et al. .................. 523/501 |
| 4,616,074 A | 10/1986 | Ruffner ..................... 526/318 |
| 4,719,132 A | 1/1988 | Porter, Jr. ................... 427/409 |
| 4,791,168 A | 12/1988 | Salatin et al. ............... 524/601 |
| 4,851,460 A | 7/1989 | Stranghöner et al. ....... 523/407 |
| RE33,008 E | 8/1989 | Ruffner et al. .............. 526/270 |
| 5,015,688 A | 5/1991 | Bederke et al. ............. 524/600 |
| 5,026,818 A | 6/1991 | Heinz et al. ................ 528/313 |
| 5,071,904 A | 12/1991 | Martin et al. ............... 524/458 |
| 5,098,947 A | 3/1992 | Metzger et al. ............. 524/507 |
| 5,136,004 A | 8/1992 | Bederke et al. ............. 526/273 |
| 5,155,163 A | 10/1992 | Abeywardena et al. ..... 524/591 |
| 5,238,745 A | * 8/1993 | Valet et al. ................. 428/413 |
| 5,342,882 A | 8/1994 | Göbel et al. ................ 524/832 |
| 5,354,807 A | 10/1994 | Dochniak ................... 524/591 |
| 5,356,973 A | 10/1994 | Taljan et al. ................ 524/314 |
| 5,368,944 A | 11/1994 | Hartung et al. ........... 428/423.1 |
| 5,401,790 A | 3/1995 | Poole et al. ................. 524/199 |
| 5,412,023 A | 5/1995 | Hille et al. .................. 524/539 |
| 5,459,197 A | 10/1995 | Schwindt et al. ........... 524/591 |
| 5,460,892 A | 10/1995 | Bederke et al. ............. 428/482 |
| 5,468,802 A | 11/1995 | Wilt et al. .................. 524/539 |
| 5,554,686 A | 9/1996 | Frisch, Jr. et al. .......... 524/588 |
| 5,589,534 A | 12/1996 | Metzger et al. ............. 524/548 |
| 5,614,584 A | 3/1997 | Schwan et al. ............. 524/591 |
| 5,635,559 A | 6/1997 | Brock et al. ................ 524/839 |
| 5,646,214 A | 7/1997 | Mayo .......................... 524/10 |
| 5,648,410 A | 7/1997 | Hille et al. .................. 523/501 |
| 5,684,072 A | 11/1997 | Rardon et al. .............. 524/199 |
| 5,698,330 A | 12/1997 | Bederke et al. .......... 428/423.1 |
| 5,703,155 A | 12/1997 | Swarup et al. .............. 524/558 |
| 5,719,212 A | * 2/1998 | Nakae et al. ................ 523/451 |
| 5,741,552 A | 4/1998 | Takayama et al. ....... 427/407.1 |
| 5,759,694 A | 6/1998 | Mayo et al. .............. 428/423.1 |
| 5,814,410 A | 9/1998 | Singer et al. ............ 428/423.1 |
| 5,925,698 A | 7/1999 | Steckel ....................... 524/322 |
| 6,025,449 A | * 2/2000 | Enomoto et al. ........... 524/558 |
| 6,203,913 B1 | * 3/2001 | Kondos et al. .......... 428/423.1 |

FOREIGN PATENT DOCUMENTS

| | | |
|---|---|---|
| DE | 2627320 | 12/1977 |
| EP | 0069839 B1 | 1/1983 |
| EP | 0038127 | 10/1984 |
| EP | 0210747 | 2/1987 |
| EP | 0238166 B1 | 9/1991 |
| EP | 0567214 A1 | 10/1993 |
| EP | 0238166 B2 | 9/1994 |
| EP | 0794212 | 9/1997 |
| GB | 1579672 | 11/1980 |
| JP | 55090563 | 7/1980 |
| JP | 06239957 | 8/1994 |
| JP | 10292084 | 11/1998 |
| JP | 2000-44635 | 2/2000 |
| WO | WO94/05733 | 3/1994 |
| WO | WO 95/07951 | 3/1995 |
| WO | WO95/27013 | 10/1995 |
| WO | WO97/30097 | 8/1997 |

OTHER PUBLICATIONS

J. Nelson et al., "Castor–Based Derivatives: Synthesis of Some Acrylate Esters", J. Am. Oil Chem Society 43 (9) 1966 pp. 542–545.
"Non aqueous resin dispersion . . . "; Derwent Documentation Abstracts Journal.; No. 03, 1999, XP002141159.
English Abstract for EP 69839.
English Abstract for DE 2627320.

\* cited by examiner

Primary Examiner—James J. Seidleck
Assistant Examiner—Melanie Bissett
(74) Attorney, Agent, or Firm—Deborah M. Altman

(57) ABSTRACT

A multi-component composite coating composition is provided which includes a basecoat deposited from an aqueous basecoat film-forming composition and a transparent topcoat applied over the basecoat. The basecoat film-forming composition includes at least one crosslinkable film-forming resin and at least one amphiphilic alcohol having the structural formula: HO—R, wherein R includes a linear hydrocarbon segment having at least seven contiguous carbon atoms. The amphiphilic alcohol is present in an amount ranging from about 0.01 to about 50 weight percent based upon total amount of resin solids of the basecoat film-forming composition. A coated substrate is also provided.

16 Claims, No Drawings

MULTI-COMPONENT COMPOSITE COATING COMPOSITION AND COATED SUBSTRATE

CROSS-REFERENCE TO RELATED APPLICATION

This patent application is related to provisional U.S. patent application Serial No. 60/075,030 entitled "Low Temperature Cure Waterborne Coating Compositions Having Improved Appearance And Humidity Resistance", filed Feb. 18, 1998.

FIELD OF THE INVENTION

The present invention relates to aqueous coating compositions and, more particularly, to their use in multi-component composite coating compositions as primers or pigmented or colored base coats overcoated with transparent topcoats which provide good smoothness and appearance in automotive coating applications.

BACKGROUND OF THE INVENTION

Over the past decade, there has been a concerted effort to reduce atmospheric pollution caused by volatile solvents which are emitted during the painting process. However, it is often difficult to achieve high quality, smooth coating finishes, such as are required in the automotive industry, without using organic solvents which contribute greatly to flow and leveling of a coating.

One of the major goals of the coatings industry is to minimize the use of organic solvents by formulating waterborne coating compositions which provide a smooth, high gloss appearance, as well as good physical properties. Achieving good appearance in popular "metallic look" coatings is particularly challenging. To achieve optimum appearance, the metallic pigment flake should be oriented such that it is parallel to the coated surface so that the visual change in brightness or lightness of the metallic flake with a change in viewing angle (flop) accentuates the lines and curves of the automobile. It is also very important that the metallic pigment be uniformly oriented across the surface of the substrate, otherwise blotchy areas of light and dark color (mottling) will be observed.

Waterborne coating compositions also are sensitive to application conditions. It is often difficult to consistently obtain smooth films free of solvent popping when the coating composition is applied over a wide range of relative humidities. At high humidity, mottling of the film is frequently observed. Wetting of the clearcoat over the basecoat and recoatability and color matching for repair of defects are other challenges in formulating waterborne coating compositions.

Therefore, it would be desirable to provide a waterborne coating composition which is useful as an original finish for automobiles and which can be applied as a smooth film having good flop under a variety of application conditions.

SUMMARY OF THE INVENTION

The present invention provides a multi-component composite coating composition comprising a basecoat deposited from an aqueous basecoat film-forming composition and a transparent topcoat applied over the basecoat in which the transparent topcoat is deposited from a topcoat film-forming composition, the basecoat film-forming composition comprising: (a) at least one crosslinkable film-forming resin; and (b) at least one amphiphilic alcohol having the structural formula (I):

HO—R                                                                            (I)

wherein R comprises a linear hydrocarbon segment having at least seven contiguous carbon atoms, the amphiphilic alcohol being present in an amount ranging from about 0.01 to about 50 weight percent based upon total amount of resin solids of the basecoat film-forming composition. A substrate having a surface coating of the above multi-component composite coating composition is also provided.

DETAILED DESCRIPTION OF THE PREFERRED EMBODIMENTS

The multi-component composite coating composition of the present invention can be used as any of the waterborne compositions useful in coating applications, and is particularly useful in automotive coating applications. The multi-component composite coating composition can be used as a colored base coat layer overcoated with a transparent topcoat layer in a "color-plus-clear" composite coating system.

The basecoat coating composition comprises one or more crosslinkable film-forming resins and one or more amphiphilic alcohols present in an aqueous medium.

Useful crosslinkable film-forming resins include acrylic polymers, polyesters, including alkyds, polyurethanes, polyamides, polyethers and copolymers and mixtures thereof. These resins can be self-crosslinking or crosslinked by reaction with suitable crosslinking materials included in the basecoat composition.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, preferably having 2 to 4 carbon atoms in the hydroxy alkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can be prepared with N-(alkoxymethyl)acrylamides and N-(alkoxymethyl) methacrylamides which result in self-crosslinking acrylic polymers.

Acrylic polymers can be prepared via aqueous emulsion polymerization techniques and used directly in the preparation of the aqueous coating composition, or via organic solution polymerization techniques with groups capable of salt formation such as acid or amine groups. Upon neutralization of these groups with a base or acid, the polymers can be dispersed into aqueous medium.

As discussed above, the crosslinkable film-forming resin can be an alkyd resin or a polyester. Such polymers can be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid. Besides the polycarboxylic acids mentioned above, functional equivalents of the acids such as anhydrides where they exist or lower alkyl esters of the acids such as methyl esters can be used. Where it is desired to produce air-drying alkyd resins, suitable drying oil fatty acids can be used and include those derived from linseed oil, soya bean oil, tall oil, dehydrated castor oil, or tung oil. The polyesters and alkyd resins contain a portion of free hydroxyl and/or carboxyl groups which are available for further crosslinking reactions.

Polyurethanes can also be used as the crosslinkable film-forming resin of the basecoat coating composition. Useful polyurethanes include polymeric polyols which are prepared by reacting polyester polyols or acrylic polyols, such as those mentioned above, with a polyisocyanate such that the OH/NCO equivalent ratio is greater than 1:1 so that free hydroxyl groups are present in the product.

The organic polyisocyanate which is used to prepare the polyurethane polyol can be an aliphatic or aromatic polyisocyanate or mixtures thereof. Diisocyanates are preferred, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates such as isophorone diisocyanate and 4,4'-methylene-bis-(cyclohexyl isocyanate) can be used. Examples of suitable higher polyisocyanates include 1,2,4-benzene triisocyanate and polymethylene polyphenyl isocyanate.

Usually the polyester and polyurethane are prepared with unreacted carboxylic acid groups, which upon neutralization with bases such as amines allows for dispersion into aqueous medium.

Other useful crosslinkable film-forming resins include polyamides, such as acrylamide, methacrylamide, N-alkylacrylamides and N-alkylmethacrylamides.

Generally, suitable crosslinkable film-forming resins have a weight average molecular weight greater than about 2000 grams per mole, preferably ranging from about 2000 to about 100,000 grams per mole (as determined by gel permeation chromatography using a polystyrene standard) and a hydroxyl equivalent weight ranging from about 400 to about 4000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The crosslinkable film-forming resin can have an acid value ranging from about 5 to about 100 mg KOH/g resin, and preferably about 20 to about 50 mg KOH/g resin. The acid value (number of milligrams of KOH per gram of solid required to neutralize the acid functionality in the resin) is a measure of the amount of acid functionality in the resin.

Waterborne coating compositions are disclosed in U.S. Pat. No. 4,403,003 (incorporated by reference herein), and the polymeric resinous compositions used in preparing these compositions can be used as the crosslinkable film-forming resin in the practice of this invention. Also, water-based polyurethanes such as those prepared in accordance with U.S. Pat. No. 4,147,679 (incorporated by reference herein) can be used as the crosslinkable film-forming resin in the basecoat coating composition.

Preferably, the crosslinkable film-forming resin is an aqueous dispersion of a blend of acrylic and polyester and/or polyurethane materials in microparticulate form. Such dispersions can be produced by a high stress technique using a homogenizer as described in U.S. Pat. No. 5,071,904, incorporated by reference herein. In this technique, the polymeric film-forming resin is a latex which comprises polymeric microparticles prepared by forming a mixture in aqueous medium of an ethylenically unsaturated monomer or mixture of ethylenically unsaturated monomers with a substantially hydrophobic polymer. The hydrophobic polymer is essentially free of repeating acrylic or vinyl units in the polymer backbone and has a molecular weight of greater than about 300 grams per mole. The hydrophobic polymer is preferably a polyester or polyurethane. The monomer(s) and hydrophobic polymer are particularized into microparticles by high stress techniques using a homogenizer followed by polymerizing the ethylenically unsaturated monomer(s) to form polymeric microparticles which are stably dispersed in the aqueous medium. These microparticles can be internally crosslinked so as to form microgels.

Generally, the crosslinkable film-forming resin is present in an amount ranging from about 25 to about 100 weight percent on a basis of total resin solids of the aqueous coating composition, preferably about 50 to about 95 weight percent and, more preferably, greater than 70 to about 90 weight percent.

The basecoat coating composition can further comprise one or more crosslinking materials capable of reacting with the crosslinkable film-forming resin to form a crosslinked film. The crosslinking material can be present as a mixture with the other components of the basecoat coating composition (conventionally referred to as a one-pack system), or in a separate composition which is mixed with the crosslinkable film-forming resin within a few hours prior to application of the coating composition to the substrate (conventionally referred to as a two-pack system).

Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are substantially alkylated with methanol or butanol.

The polyisocyanate which is utilized as a crosslinking agent can be prepared from a variety of isocyanate-containing materials. Preferably the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime and lactams such as caprolactam.

Generally, the crosslinking material is present in an amount ranging from about 5 to about 50 weight percent on a basis of total resin solids of the basecoat coating composition, preferably about 10 to about 30 weight percent and, more preferably, about 10 to about 20 weight percent.

In an important aspect of the present invention, the aqueous basecoat coating composition comprises one or more amphiphilic alcohol compounds. The amphiphilic alcohol has a water-soluble, generally hydrophilic polar end and a water-insoluble, generally hydrophobic hydrocarbon end, as shown by the following structural formula (I):

$$\text{HO—R} \tag{I}$$

wherein R designates the hydrocarbon end of the molecule which comprises a linear hydrocarbon segment having at least seven contiguous carbon atoms. In a preferred embodiment, the hydrocarbon end includes 7 to about 24 contiguous carbon atoms, at least seven of which are in a linear configuration. More preferably, the hydrocarbon end includes 7 to about 18 contiguous carbon atoms. The hydrocarbon segment can be a pendant or terminal end group, but preferably is a terminal end group positioned generally opposite to the water-soluble polar end (OH group) of the amphiphilic alcohol.

The hydrocarbon end of the amphiphilic alcohol can further comprise one or more hydrophilic functional pendant groups selected from hydroxyl groups, amide groups, urea groups, carbamate groups, urethane groups, mercaptan groups, mixtures and combinations thereof. The presence of hydroxyl functional pendant groups is not preferred. Preferably, the hydrocarbon end of the amphiphilic alcohol is free of hydrophilic functional groups.

The amphiphilic alcohol can be saturated or unsaturated, but preferably it is at least substantially saturated along the hydrocarbon segment. The amphiphilic alcohol can be branched or unbranched, and can include functional groups such ester groups and/or ether groups and/or other functional groups containing nitrogen, oxygen, or sulfur. Preferably such functional groups are not positioned near the hydrophobic end.

The amphiphilic alcohol is preferably essentially free of acid functionality, i.e., it has an acid value of less than 30, preferably less than about 20, more preferably less than about 10, and most preferably less than about 5. It is preferred that the amphiphilic alcohol be free of any acid functional groups.

Generally, the amphiphilic alcohol has a molecular weight ranging from about 116 to about 284 grams per mole, and more preferably about 116 to about 270 grams per mole, as determined by gel permeation chromatography using polystyrene as a standard.

Non-limiting examples of hydrocarbon alcohols useful in the present invention include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and isomers and mixtures thereof.

The amphiphilic alcohol of the present invention can be added to the basecoat coating composition neat; that is, it is added by itself or in other resinous ingredients, or with solvents or other diluents. Preferably, it is not added in association with the pigment (if present) or as part of the grind vehicle.

Generally, the amphiphilic alcohol is present in an amount ranging from about 0.01 to about 50 weight percent based upon total amount of resin solids of the basecoat coating composition (excluding the amphiphilic alcohol), preferably about 0.1 to about 25 weight percent and, more preferably, about 0.1 to about 15 weight percent.

If desired, the basecoat coating composition can comprise other optional materials well known in the art of formulated surface coatings, such as surfactants, flow control agents, thixotropic agents such as bentonite clay, fillers, anti-gassing agents, organic cosolvents, catalysts, including phosphonic acids and other customary auxiliaries. These materials can constitute up to 40 percent by weight of the total weight of the coating composition.

The basecoat coating composition preferably contains pigments or dyes to give it color. In general, the pigment is incorporated into the coating composition in amounts of about 1 to 80 percent, and usually about 1 to 30 percent by weight based on total weight of the coating composition. Color pigments conventionally used in surface coatings include inorganic pigments such as titanium dioxide, iron oxide, chromium oxide, lead chromate, and carbon black; and organic pigments such as phthalocyanine blue and phthalocyanine green. Metallic flake pigments are also useful in waterborne compositions of the present invention. Suitable metallic pigments include aluminum flake, copper bronze flake and metal oxide coated mica. Aluminum flake is preferred.

The solids content of the aqueous basecoat coating composition generally ranges from about 10 to about 80 weight percent on a basis of total weight of the coating composition, preferably about 15 to about 60 weight percent.

The composite coating compositions of the present invention can be applied to various substrates to which they adhere, including wood, metals, glass, cloth, polymeric substrates and the like. They are particularly useful for coating metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 80 percent.

After application of the aqueous basecoat coating composition to the substrate, a film is formed on the surface of the substrate by driving water out of the film by heating or by an air-drying period. The coating is heated preferably only for a short period of time sufficient to ensure that a topcoat such as a clearcoat can be applied to the basecoat if desired without the former dissolving the basecoat composition. Suitable drying conditions will depend on the particular basecoat composition and on the ambient humidity, but in general a drying time of from about 1 to 30 minutes at a temperature of about 80–250° F. (20–121° C.), preferably about 66–121° C., will be adequate to ensure that mixing of the two coats is minimized. At the same time, the basecoat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes. Typically, the basecoat coating thickness ranges from about 0.1 to about 5 mils (about 2.54 to about 127 microns), and preferably about 0.4 to about 1.5 mils (about 10.16 to about 38.1 microns) in thickness.

After application of the basecoat, a topcoat is applied. The topcoat can be waterborne, solventborne or powdered. Preferably the topcoat coating composition is a crosslinkable coating comprising at least one thermosettable film-forming material and at least one crosslinking material. Suitable waterborne clearcoats are disclosed in U.S. Pat. No. 5,098,947 (incorporated by reference herein) and are based on water soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats are described in U.S. Pat. No. 5,663,240 (incorporated by reference herein) and include epoxy functional acrylic copolymers and polycarboxylic acid crosslinking agents. Preferably, the topcoat coating composition is chemically different or contains different relative amounts of ingredients from the basecoat coating composition, although the topcoat coating composition can be the same as the basecoat coating composition but without the pigments.

The topcoat coating composition can be applied to the surface of the basecoat by any of the coating processes discussed above for applying the basecoat coating composition to the substrate. The coated substrate is then heated to cure the coating layers.

In the curing operation, solvents are driven off and the film-forming materials of the clearcoat and the basecoat are each crosslinked. The heating or curing operation is usually carried out at a temperature in the range of from 160–350+ F. (71–177° C.) but if needed, lower or higher temperatures may be used as necessary to activate crosslinking mechanisms. The thickness of the clearcoat usually ranges from about 0.5 to about 5 mils (about 12.7 to about 127 microns), preferably about 1.2 to about 3 mils (about 30.48 to about 76.2 microns).

The present invention will further be described by reference to the following examples. The following examples are merely illustrative of the invention and are not intended to be limiting. Unless otherwise indicated, all parts are by weight.

COATING EXAMPLES 1–10

A silver metallic basecoat was prepared as follows. Components listed under "Organic Slurry" in Table 1 were added in order under agitation. After the aluminum pastes were added, the slurry was allowed to stir under high shear for 20–30 minutes before addition of the remaining components. In a separate container, components listed under "Aqueous Phase" were added in order under agitation. The "Organic Slurry" premix was then added under agitation to the "Organic Phase" and the mixture was allowed to stir for 10 minutes. The pH of the basecoat formula was adjusted to 8.6 with a 50% aqueous solution of dimethylethanolamine (DMEA).

TABLE 1

| Component | Parts by weight |
| --- | --- |
| Organic Slurry | |
| Ethylene glycol monobutyl ether | 25.6 |
| Ethylene glycol monohexyl ether | 513.0 |
| defoamer[1] | 27.0 |
| Aluminum Passivator[2] | 117.5 |
| melamine resin[3] | 149.9 |
| UV absorber[4] | 20.3 |
| Phosphatized Epoxy[5] | 11.5 |
| Polyester Oligomer[6] | 151.2 |
| Aluminum Paste[7] | 217.9 |
| Aluminum Paste[8] | 117.2 |
| 50% Aqueous DMEA | 4.1 |
| Mineral Spirits[9] | 86.4 |
| SURFYNOL® 104E[10] | 37.8 |
| BYK® 348 flow additive[11] | 2.4 |
| Aqueous Phase | |
| Latex[12] | 772.2 |
| Deionized water | 1620.0 |
| Polyurethane acrylic dispersion[13] | 1082.7 |
| Acrylic dispersion EPL 6920[14] | 1942.7 |
| ACRYSOL® ASE-60[15] | 38.6 |
| Ethylene glycol monohexyl ether | 90.9 |
| 50% Aqueous DMEA | 12.2 |

[1]BYK® 031 defoamer which is commercially available from Byk-Chemie.
[2]An aluminum passivator solution comprised of LUBRIZOL® 2062 (100 parts; supplied at 65% solids in isobutyl alcohol from The Lubrizol Corp.), ethylene glycol monobutyl ether (58.8 parts), and 50% aqueous DMEA (7.1 parts).
[3]CYMEL® 327 partially methylated melamine resin available from Cytec Industries, Inc.
[4]TINUVIN® 1130 Substituted benzotriazole UV absorber available from Ciba Additives.
[5]Phosphatized epoxy prepared from EPON® 828, a polyglycidyl ether of bisphenol A, available from Shell Oil and Chemical Co.; reacted with phosphoric acid at an 83:17 weight ratio.
[6]Polyester prepared from 1,4-cyclohexane dicarboxylic acid, trimethylolpropane, and isostearic acid in a 1:2:1 mole ratio at 90% solids content in xylene.
[7]ALPATE® F 798 non-chromated aluminum paste available from Toyo Aluminum.
[8]ALPATE® 8160N-AR non-chromated aluminum paste available from Toyo Aluminum.
[9]SHELLSOL® 071 mineral spirits available from Shell Chemical Co.
[10]SURFYNOL® 104E acetylenic diol available from Air Products.
[11]BYK® 348 flow additive available from Byk-Chemie.
[12]Prepared according to U.S. Pat. No. 5,510,148, see example 1.
[13]Polyurethane/acrylic dispersion prepared as follows. A polyurethane prepolymer was prepared by blending dimethylolpropionic acid (34.9 parts); DESMODUR® W (140.3 parts available from Bayer Corp.); dimer isocyanate (81.3 parts, DDI 1410 available from Henkel Corp.); FORMREZ® 66–56 (199.5 parts available from Witco Corp.); MPEG 2000 (50.3 parts available from Union Carbide, Inc.); dibutyltin dilaurate (0.4 parts); and N-methyl pyrrolidone (130.2 parts) and heating at 90° C. until the NCO equivalent weight reached 1079. The prepolymer was cooled to 35° C. and methyl methacrylate (197.9 parts), butyl acylate (136.8 parts), and ethylene glycol dimethacrylate (14.0 parts) were added, followed by N,N-dimethylethanolamine (23.2 parts). This mixture was dispersed into deionized water (2372.1 parts) containing diethylenetriamine (18.7 parts) at 40° C. over 20 minutes and was held at 40° C. for 15 minutes. The dispersion was passed through a MICROFLUIDIZER® emulsifier at 8000 psi and was then heated to 60° C. A solution of ammonium persulfate (1.28 parts) in deionized water (99.4 parts) was slowly added, and the temperature was adjusted to 80° C. and held for 30 minutes. The resulting polymer dispersion had a solids content of approximately 25 percent.
[14]EPL 6920 polyacrylic dispersion available from Akzo Nobel.
[15]ACRYSOL® ASE-60 latex thickener commercially available from Rohm & Haas.

Coating examples 1–10 were prepared as follows. Example 1 is a control containing only the silver metallic basecoat of Table 1 reduced to a viscosity of 40 seconds on a #4 DIN cup. Examples 2 and 3 are comparative examples which, in addition to the reduced viscosity basecoat, include alcohols having less than 7 contiguous carbon atoms. Examples 4–10 are basecoats formulated according to the present invention which include amphiphilic alcohols having at least 7 contiguous carbon atoms. To prepare coating examples 2–10, 7.8 parts by weight of each of the alcohols listed in Table 2 below were post-added under agitation to 200 parts of reduced basecoat.

Each coating example was evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F. The basecoat compositions from Table 2 were spray applied (two coats automated spray with 30 seconds ambient flash between coats) at 60% relative humidity and 70+ F. to give a dry film thickness of 0.4 to 0.6 mils. The panels were flash baked for 5 minutes at 80° C. (176° F.). The panels were then topcoated with a commercially available two-component isocyanate clearcoat, coded WTKR2000 from PPG Industries, Inc., to give a dry film thickness of 1.6 mils.

The finished panels were evaluated for appearance, and the results are shown in Table 2. Higher values of flop index and lower values of longwave and shortwave scan are indicative of smoother appearance. As shown in Table 2, multi-component composite coating compositions having amphiphilic alcohols according to the present invention generally have better metallic appearance and in some evaluations better smoothness than composite coating compositions without the amphiphilic alcohols.

TABLE 2

| EXAMPLE | ALCOHOL | FLOP INDEX[16] | LONG-WAVE[17] | SHORTWAVE[17] |
|---|---|---|---|---|
| Ex. 1 (comp) | None | 11.77 | 1.3 | 6.4 |
| Ex. 2 (comp) | Ethanol | 11.46 | 1.9 | 5.9 |
| Ex. 3 (comp) | n-Butanol | 11.77 | 1.9 | 6.3 |
| Ex. 4 | n-Heptanol | 13.32 | 1.5 | 2.6 |
| Ex. 5 | n-Octanol | 13.46 | 1.4 | 5.1 |
| Ex. 6 | n-Nonanol | 13.37 | 1.4 | 5.4 |
| Ex. 7 | n-Decanol | 13.14 | 1.2 | 6.5 |
| Ex. 8 | n-Undecanol | 12.98 | 1.5 | 6.6 |
| Ex. 9 | n-Tridecanol | 12.92 | 2.2 | 9.2 |
| Ex. 10 | Isostearyl Alcohol | 12.03 | 3.2 | 16.1 |

[16]Measurement corresponding to a ratio of specular versus angular reflectance obtained from an X-Rite MA68I Multi-angle spectrophotometer, where higher numbers indicate better flop.
[17]Longwave and shortwave values obtained from a Byk Wavescan device from Byk-Gardner, where lower numbers indicate smoother appearance.

COATING EXAMPLES 1–13

For Examples 11–13, the same silver metallic basecoat premix as described in Table 1 was used. Additives were post-added under agitation, as shown in Table 3. The pH of the final coatings was adjusted, if necessary, to 8.6 with a 50% aqueous solution of DMEA, and the viscosity of each coating was adjusted to 40 seconds on a #4 DIN cup with deionized water. The coatings were applied as described in the previous examples. Results of appearance evaluations of the coated substrates are reported in Table 3 below. As shown in Table 3, the composite coating of Comparative Example 12 having acid functional isostearic acid in the basecoat has a lower flip/flop value than Example 13, which is a composite coating having hydroxyl functional isostearyl alcohol in the basecoat according to the present invention.

TABLE 3

| | Parts by weight | | |
|---|---|---|---|
| Component | Ex. 11 (comp) | Ex. 12 (comp) | Ex. 13 |
| Basecoat Premix (Table 1) | 200.0 | 200.0 | 200.0 |
| Isostearic acid | — | 7.8 | — |
| Isostearyl alcohol | — | — | 7.8 |
| Appearance Measurements | | | |
| Flip/Flop Value[18] | 1.48 | 1.47 | 1.54 |
| X-Rite Values[19] | | | 12.48 |
| Flop index | 11.56 | 11.14 | 132.56 |
| $L_{15}$ | 129.15 | 126.94 | 107.23 |
| $L_{25}$ | 105.72 | 102.69 | 63.85 |
| $L_{45}$ | 65.23 | 64.96 | 39.38 |
| $L_{75}$ | 41.26 | 42.56 | 32.77 |
| $L_{110}$ | 34.45 | 35.66 | |

[18]Ratio of face and angular reflectance measured on an Alcope LMR-200 multiple angle reflectometer, where higher numbers show a greater face/flop difference.
[19]Lightness measurements using an X-Rite MA6811 multiple angle spectrophotometer.

COATING EXAMPLES 14 AND 15

For coating examples 14 and 15, a polyester acrylic latex (L-1) was prepared as follows. First, a polyester (P-1) was prepared in a four-neck round bottom flask equipped with a thermometer, mechanical stirrer, condenser, dry nitrogen sparge, and a heating mantle. The following ingredients were used:

| | |
|---|---|
| 1728.0 g | stearic acid |
| 771.0 g | plentaerythritol |
| 455.0 g | crotonic acid |
| 659.0 g | phthalic anhydride |
| 7.8 g | dibutyltin oxide |
| 7.8 g | triphenyl phosphite |
| 800.0 g | butyl acrylate |

The first six ingredients were stirred in the flask at 230° C. until 292 ml of distillate was collected and the acid value dropped to 4.5. The material was cooled to 78° C. and the last ingredient was stirred in. The final product was a viscous yellow liquid with a Gardner-Holdt viscosity of X and a non-volatile content of 80.3%.

Next, a pre-emulsion was prepared by stirring together the following ingredients:

| | |
|---|---|
| 250.0 g | polyester (P-1) described above |
| 655.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The pre-emulsion was passed once through a MICROFLUIDIZER® M11 OT at 8000 psi and transferred to a four-neck round bottom flask equipped with an overhead stirrer, condenser, thermometer, and a nitrogen atmosphere. The MICROFLUIDIZER® was rinsed with 150.0 g of water, which was added to the flask. The polymerization was initiated by adding 3.0 g of isoascorbic acid and 0.02 g of ferrous ammonium sulfate dissolved in 120.0 g water followed by a ten minute addition of 5.0 g of 70% t-butyl hydroperoxide dissolved in 115.0 g of water. The temperature of the reaction increased from 27° C. to 80° C. The temperature was reduced to <30° C. and 1.0 g of isoascorbic acid dissolved in 8.0 g water was added. Ten minutes later 17 g of 33.3% aqueous dimethylethanolamine was added followed by 2.0 g of PROXEL GXL (biocide available from ICI Americas, Inc.) in 8.0 g of water. The final pH of the latex (L-1) was 6.2, the nonvolatile content was 41.0%, and the Brookfield viscosity was 12 cps (spindle #1, 50 rpm).

Coating examples 14 and 15 were prepared by addition of components listed in the "Organic Slurry" portion of Table 4, in order, under agitation. The slurry was stirred for an additional 20 minutes. Next, the components listed under "Aqueous Premix" were separately blended under agitation. The "Organic Slurry" was added under agitation to the "Aqueous Premix" portion and the entire formula was stirred for 10 minutes. The pH of the silver metallic coating was adjusted to 8.6 with a 50% aqueous solution of DMEA, and the viscosity was reduced to 30 seconds on a #4 DIN cup with deionized water.

TABLE 4

| Component | Parts by weight |
| --- | --- |
| Organic Slurry | |
| Diethylene glycol monobutyl ether | 22.0 |
| Ethylene glycol monohexyl ether | 45.6 |
| Polypropylene glycol[20] | 24.0 |
| TINUVIN ® 1130[4] | 6.0 |
| SHELLSOL ® 071[9] | 7.6 |
| Aluminum Passivator[21] | 11.8 |
| Phosphatized Epoxy[5] | 2.0 |
| Aluminum Paste[22] | 46.4 |
| CYMEL ® 322 melamine resin[23] | 48.0 |
| 50% Aqueous DMEA | 18.0 |
| Aqueous Premix | |
| Polyester acrylic latex (L-1) | 218.6 |
| Polyurethane acrylic dispersion[13] | 123.0 |
| Acidic oligomeric polyester[24] | 25.0 |
| Deionized water | 50 |

[20]Polypropylene glycol ($M_w$ = 425) available from ARCO Chemical Co.
[21]Prepared according to U.S. Pat. No. 5,429,674, see Example 6.
[22]ALPATE ® 7670 NS-A, a nonchromated aluminum paste available from Toyo Aluminum K.K.
[23]CYMEL ® 322 partially methylated melamine resin available from CYTEC Industries, Inc.
[24]Prepared according to U.S. Pat. No. 5,356,973, see Example A.

The metallic basecoat of Table 4 provides a surface which is very hydrophobic and tends to give a rough appearance with two-component isocyanate clearcoats.

Referring now to Table 5, Comparative Example 14, which incorporates the basecoat of Table 4, contains no alcohol additive. In contrast, in Example 15 (according to the present invention), isostearyl alcohol is added to the basecoat of Table 4.

The basecoat of each of Examples 14 and 15 were evaluated as follows. ACT cold roll steel panels (4"×12") were electrocoated with a cationically electrodepositable primer commercially available from PPG Industries, Inc. as ED-5000. The panels were then primed with a commercially available PPG primer surfacer coded as GPX05379 and cured for 30 minutes at 325° F. The basecoat compositions from Table 5 were spray applied (two coats automated spray with 30 seconds ambient flash between coats) at 60% relative humidity and 70+ F. to give a dry film thickness of 0.4 to 0.6 mils. The panels were flash baked for 5 minutes at 80° C. (176° F.). One set of panels coated only with the basecoats was fully baked for 30 minutes at 140° C. (285° F.). A wedge of commercially available two-component clearcoat, coded WTKR2000 available from PPG Industries, was applied to another set of basecoated panels to form a composite coating having a dry film thickness range of 0.5 to 2.5 mils. The panels were evaluated for appearance and the results are shown in Table 5.

TABLE 5

| | Parts by weight | |
| --- | --- | --- |
| Component | EXAMPLE 14 (comparative) 1 | EXAMPLE 15 |
| Metallic basecoat from Table A | 376.0 | 376.0 |
| Isostearyl alcohol | — | 20.0 |
| Basecoat Only | | |
| Flop Index[16] | 15.33 | 15.37 |
| Profilometer[25] | 24.3 | 19.7 |
| Basecoat/Clearcoat Wavescan[26] | | |
| Longwave | 52.9 | 5.4 |
| Shortwave | 31.4 | 29.5 |

[25]Smoothness rating in microinches obtained with a Taylor-Hobson Surtronic 3 profilometer, where lower numbers indicate a smoother surface.
[26]Smoothness readings taken at a clearcoat film thickness of 1.6 mils with a Byk Wavescan device. See footnote 17.

As shown in Table 5, the panel coated with the basecoat of Example 15, which included isostearyl alcohol in the basecoat, had a smoother appearance than the panel coated with the basecoat of Comparative Example 14, which did not include an alcohol.

The basecoat/clearcoat composite coatings of the present invention can provide one or more of the following advantages: good substrate wetting, enhanced wetting of the clearcoat over the basecoat, good popping resistance, pinholing resistance, smoothness, leveling, flip-flop, brilliance (metallic shades), humidity resistance and pattern control.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A multi-component composite coating composition comprising a basecoat deposited from an aqueous basecoat film-forming composition and a transparent topcoat applied over the basecoat in which the transparent topcoat is deposited from a topcoat film-forming composition, the basecoat film-forming composition comprising:

(a) at least one crosslinkable film-forming resin;

(b) at least one amphiphilic alcohol having the structural formula (I):

HO—R        (I)

wherein R comprises a linear hydrocarbon segment having seven to eleven contiguous carbon atoms, the amphiphilic alcohol being present in an amount ranging from about 0.01 to about 50 weight percent based upon total amount of resin solids of the basecoat film-forming composition; and (c) at least one crosslinking material capable of reacting with the film-forming resin to form a crosslinked film, wherein the crosslinking material is selected from the group consisting of aminoplasts, polyisocyanates and mixtures thereof.

2. The composite coating composition according to claim 1, wherein the crosslinkable film-forming resin is selected from the group consisting of polyesters, polyurethanes, acrylic polymers, polyamides, polyethers and copolymers and mixtures thereof.

3. The composite coating composition according to claim 1, wherein the crosslinkable film-forming resin is an aqueous dispersion of polymeric microparticles prepared by polymerizing ethylenically unsaturated monomers in the presence of a substantially hydrophobic polymer selected from the group consisting of polyesters and polyurethanes.

4. The composite coating composition according to claim 1, wherein the crosslinkable film-forming resin is present in an amount ranging from about 25 to about 100 weight percent on a basis of total resin solids of the basecoat film-forming composition.

5. The composite coating composition according to claim 1, wherein R comprises seven to about twenty-four contiguous carbon atoms.

6. A multi-component composite coating comprising a basecoat deposited from an aqueous basecoat film-forming composition, and a transparent topcoat applied over the basecoat in which the transparent topcoat is deposited from a topcoat film-forming composition, the basecoat film forming composition comprising:

(a) at least one crosslinkable film-forming resin; and
(b) at least one amphiphilic alcohol having the structural formula (I):

HO—R    (I)

wherein R comprises a linear hydrocarbon segment having at least seven contiguous carbon atoms, wherein R further comprises at least one pendant functional group selected from the group consisting of hydroxyl groups, amide groups, urea groups, carbamate groups, urethane groups and mercaptan groups.

7. The composite coating composition according to claim 1, wherein the amphiphilic alcohol is a monohydric alcohol.

8. The composite coating composition according to claim 7, wherein the amphiphilic alcohol is selected from the group consisting of heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and isomers and mixtures thereof.

9. The composite coating composition according to claim 1, wherein the amphiphilic alcohol has an acid value of less than about 20.

10. The composite coating composition according to claim 9, wherein the amphiphilic alcohol has an acid value of less than about 10.

11. The composite coating composition according to claim 10, wherein the amphiphilic alcohol has an acid value of less than about 5.

12. The composite coating composition according to claim 1, wherein the amphiphilic alcohol is saturated.

13. The composite coating composition according to claim 1, wherein the amphiphilic alcohol is present in an amount ranging from about 0.1 to about 15 weight percent on a based upon total amount of resin solids of the basecoat film-forming composition.

14. The composite coating composition according to claim 1, wherein the topcoat film-forming composition is selected from the group consisting of waterborne coating compositions, solventborne coating compositions and powder coating compositions.

15. The composite coating composition according to claim 1, wherein the crosslinking material is present in an amount ranging from about 5 to about 50 weight percent on a basis of total resin solids of the basecoat film-forming composition.

16. A substrate having on at least a portion of a surface thereof a multi-component composite coating composition comprising a basecoat deposited from an aqueous basecoat film-forming composition and a transparent topcoat applied over the basecoat in which the transparent top coat is deposited from a topcoat film-forming composition, the basecoat film-forming composition comprising:

(a) at least one crosslinkable film-forming resin;
(b) at least one amphiphilic alcohol having the structural formula (I):

HO—R    (I)

wherein R comprises a linear hydrocarbon segment having seven to eleven contiguous carbon atoms, the amphiphilic alcohol being present in an amount ranging from about 0.01 to about 50 weight percent based upon total amount of resin solids of the basecoat film-forming composition; and (c) at least one crosslinking material capable of reacting with the film-forming resin to form a crosslinked film, wherein the crosslinking material is selected from the group consisting of aminoplasts, polyisocyanates and mixtures thereof.

* * * * *